Oct. 18, 1966      G. BURATTI      3,279,697
ANALOG-DIGITAL CONVERTER OPERATING WITH FLUID DYNAMICS SIGNALS
Filed Dec. 11, 1964      3 Sheets-Sheet 1
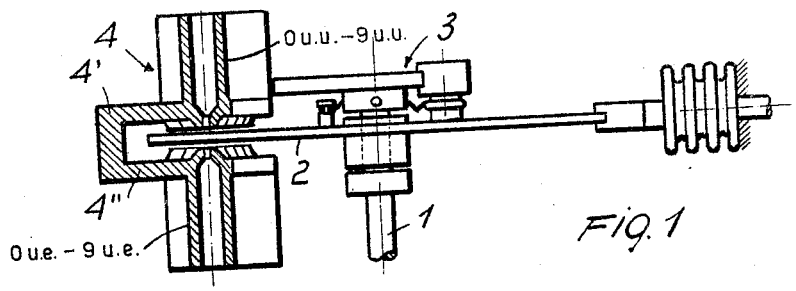
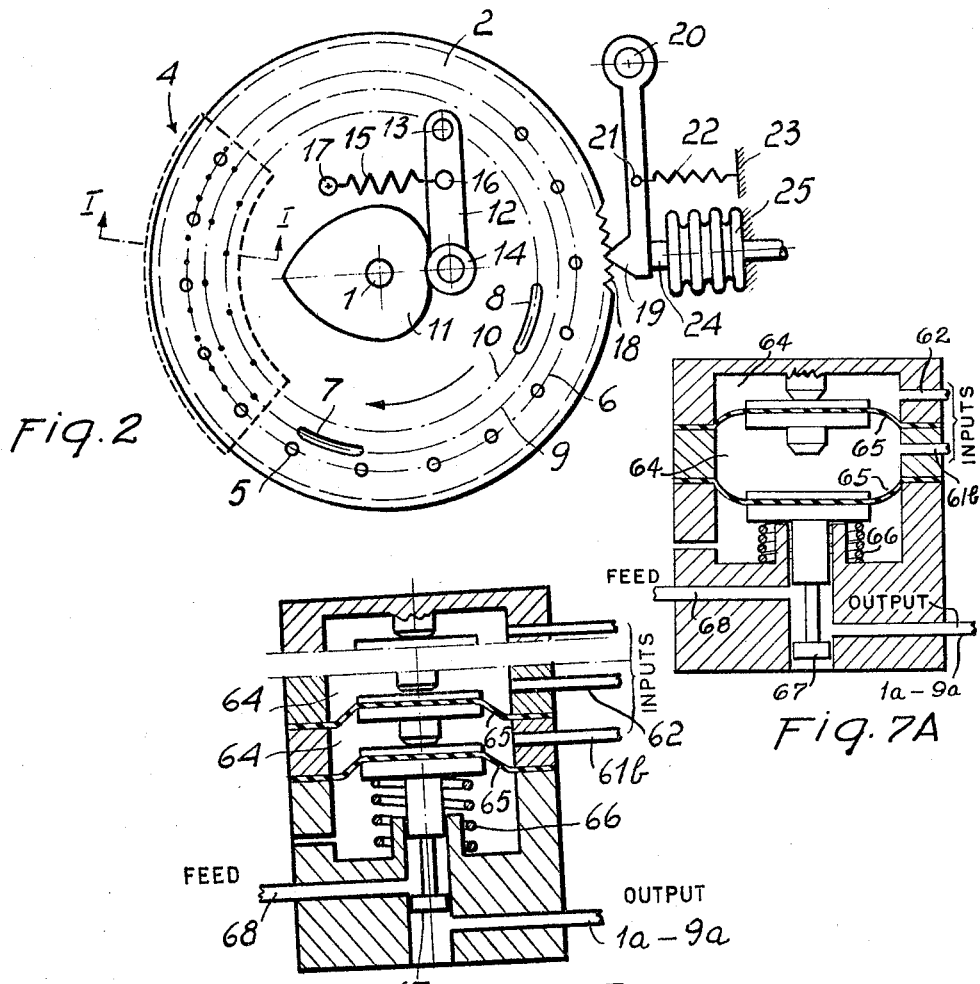
INVENTOR.
Gino Buratti
BY
Agent Oct. 18, 1966          G. BURATTI          3,279,697
ANALOG-DIGITAL CONVERTER OPERATING WITH FLUID DYNAMICS SIGNALS
Filed Dec. 11, 1964                    3 Sheets-Sheet 2

INVENTOR.
Gino Buratti
BY
Agent

INVENTOR.
Gino Buratti

United States Patent Office 3,279,697
Patented Oct. 18, 1966

3,279,697
ANALOG-DIGITAL CONVERTER OPERATING
WITH FLUID DYNAMICS SIGNALS
Gino Buratti, Viale Romagna 61, Milan, Italy
Filed Dec. 11, 1964, Ser. No. 417,730
Claims priority, application Italy, Jan. 4, 1964, 198/64
1 Claim. (Cl. 235—200)

This invention regards the field of techniques pertaining to the converting mechanisms for converting values expressed or expressible in an analog form into corresponding values expressible in a digitable form, and more specifically it relates to a mechanism type, capable of converting analog values, expressible by means of a position, to corresponding digital values, expressed in the form of signals of a fluid dynamic nature (pressure and/or rate of flow).

An object of this invention is to provide an efficient converter of the described type, which will be simple, reliable in operation, easy to handle, and of low cost.

This and further objects which will become apparent from the description which follows are attained by an analog-digital converter, the output of which is pneumatic or hydraulic, consisting of moving means the position of which are a function of the input analog signal to be converted, a series of blowing nozzle means and a series of receiving nozzle means, each receiving nozzle facing one blowing nozzle and forming a nozzle couple with it, disc means driven by said moving means and placed between the two said series of blowing and receiving nozzle means in order to stop any flow between said blowing and receiving nozzle means, passage means opened in said disc means in order that in certain positions of the disc means flow is not stopped between certain blowing and receiving nozzle couple means, the lay-out of said passage means and of said nozzle couple means, depending on the digital coding required, a source of fluid under pressure, piping means enabling connection of said blowing nozzle means to said source of fluid, piping means connecting said receiving nozzle means to the output connections of the analog-digital converter.

Such a converter-device is particularly suitable to convert analog values, expressed or expressible by means of angular, linear and similar movements into corresponding digital signal values in the form of fluid dynamic signals, i.e. pressure and/or rate of flow of a fluid such as air, liquid and the like.

Further characteristics and advantages will become more apparent and manifest from the following detailed description of a preferred but non-limiting embodiment of the converter according to this invention when taken in conjunction with the accompanying drawings, in which:

FIG. 1 represents a diagrammatical elevational view partly in section of the fluid-mechanical assembly of the converter, with certain parts omitted for clearness.

FIG. 2 represents said fluid-mechanical assembly of the converter shown in FIG. 1 in a plan view from above.

FIGS. 5–7 and 7A show different embodiments in diagrammatical sections of some fluid-functional logic devices.

The converter represented in the aforementioned figures is provided, by way of example, for the case in which the input analog quantity to be converted into a corresponding digital value is expressed or expressible by means of an angular position.

According to such embodiment, the fluid-mechanical portion of the converter is substantially constituted of a rotary shaft 1 the angular position of which expresses the value of the analog input, a disc 2, kinematically coupled with said rotary shaft 1 via a coupling 3 and described in detail hereinafter, and a plurality of nozzles 4, disposed in couples of coaxially facing nozzles, so that the disc 2, when moved by the rotary shaft 1 rotates with its peripheral part between said couples of facing nozzles 4.

Said nozzle couples are arranged according to a preestablished layout.

Figure 8:
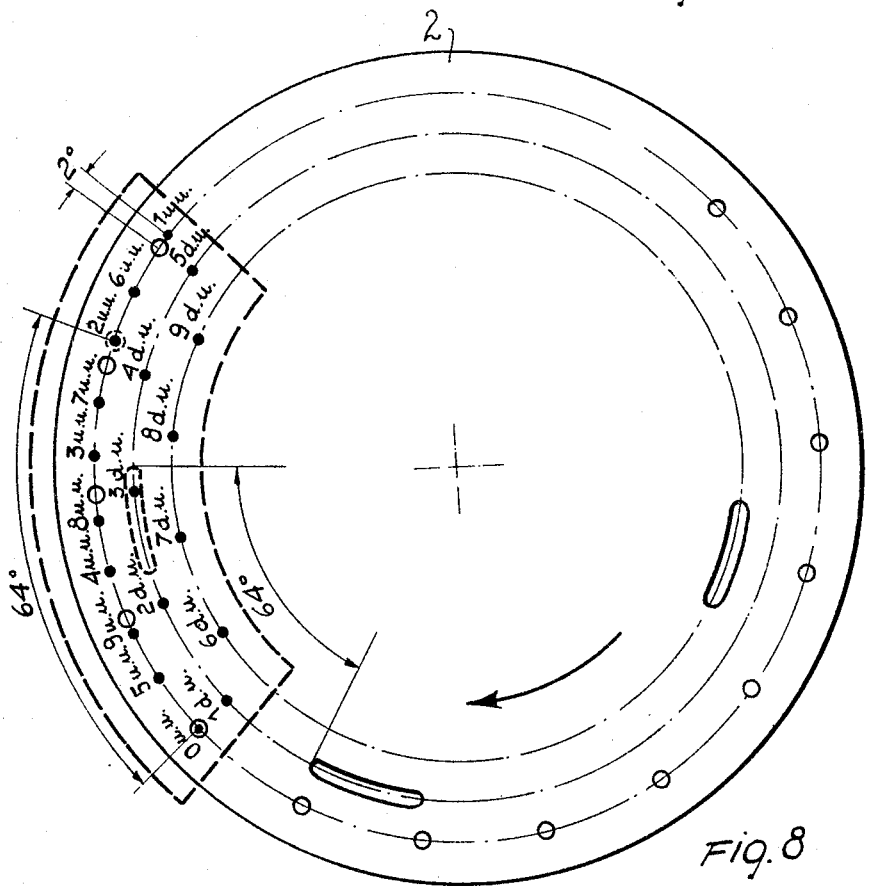
FIG. 8 is a diagrammatic plan view of the positions of the openings in the disc and of the nozzle couples.

In the peripheral zone of the disc 2, which is intersected by the nozzle couples, there are provided openings or passage means in the direction of the thickness of said disc 2, arranged according to a pattern or layout corresponding to a predetermined digital coding in relation to the layout of said nozzle couples. In the examples, the aforesaid digital coding is of a decimal system type for values ranging from 0 to 99 and is defined (see FIG. 8) by fourteen holes 5, disposed equispaced from one another according to a peripheral circumference 6 and designed to express the figures of the units from 0 to 9 as will be seen hereinafter and by two slots 7 and 8, disposed along two different concentric circumferences 9 and 10 internal to the circumference 6 and designed to express the figures of the tens from 10 to 59 and from 60 to 99 respectively. In the same example, the couples of facing nozzles are fixed to zones 4′–4″ of a nozzle holding plate having a somewhat C-shaped cross section, extending parallel on both opposed peripheral zones of the diaphragm disc 2 according to a part of circle ring of such a size as to radially extend over the circumferential arrangements of the holes 5 and slots 7 and 8 (see FIGS. 2 and 8). According to the aforesaid arrangement taken as an example of the holes 5 and slots 7 and 8, the facing nozzles of the couples corresponding to the figures of units from 0 to 9, shown by reference numbers from $0u.u.$ to $9u.u$ and from $0u.e.$ to $9u.e.$ are fixed to plate 4 according to a certain sequence along circumference 6, whilst the facing nozzles of the couples corresponding to the figures of the tens from 10 to 59, shown by reference numbers from $1d.u.$ to $5d.u.$ and from $1d.e.$ to $5d.e.$, respectively, and those corresponding to the figures of the tens from 60 to 99, shown by the reference numbers from $6d.u.$ to $9d.u.$ and from $6d.e.$ to $9d.e.$ are fixed to said plate 4 in an equispaced manner along circumferences 9 and 10 respectively.

Coupling 3 between the rotary shaft 1 and the disc 2 consists essentially of a cam 11, the cam having substantially a heart-shaped profile and, keyed on said rotary shaft 1, a lever 12 hinged with one of its ends in 13 to the disc 2 and the other end provided with a loose roller 14 pressed against said cam 11 by a return spring 15, the ends of which are connected in 16 to a point of the lever 12 and in 17 to the disc 2.

It will be appreciated that cam 11, lever 12, roller 14 and spring 15 are means which elastically urge said disc 2 in a pre-established normal position thereof, with respect to said shaft 1.

In fact spring 15 presses constantly the roller 14 against the contour of the heart-shaped cam 11. The contour of the cam 11 has such a curvature that the perpendicular to the contour passes always at a distance from the center 1. In this way there is a torque which brings the disc 2 in the relative position shown in FIG. 2, when the relative position is different.

It will be appreciated that coupling 3 constitutes a means for receiving an analog signal in the form of an angular movement of the shaft 1.

Figure 4:
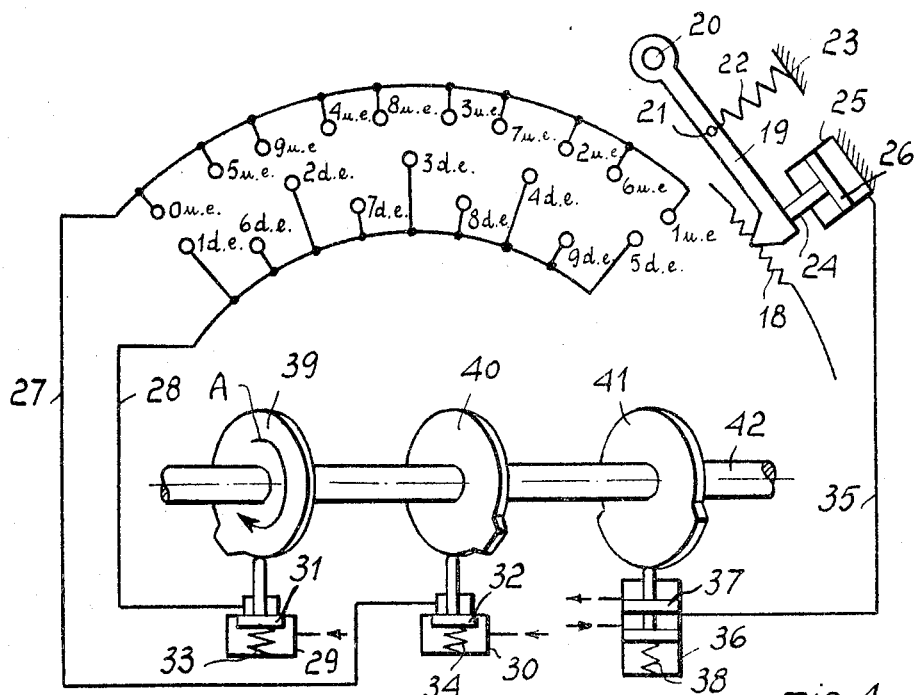
FIG. 4 represents the fluid-functional diagram of the blowing nozzles, sequencing mechanism and their connections.

The disc 2 is provided on its peripheral border with a toothing 18 with which a lever 19 is designed to cooperate as a pawl for the angular positioning of the disc 2. Said lever 19 is hinged in 20 and is connected at a point 21 to the end of a tension-spring 22, the other end of which is connected to a fixed point 23 of the frame of the apparatus. Lever 19 is further connected to the stem 24 of a fluid operated power cylinder mechanism 25 with piston 26 (see FIG. 4). The system consisting of the toothing 18, the lever 19 and the above described cooperating parts serves to avoid ambiguities in the reading of the position of the disc 2 and hence of the shaft 1, should this have taken an intermediate position between two subsequent units.

It will be appreciated that lever 19 and toothing 18 constitute locking means for temporary locking said disc in different pre-established positions thereof.

The aforementioned coupling 3 is an elastic coupling and constitutes also such a safety device that even if the rotary shaft 1 moves during the reading, i.e. whilst the disc 2 is locked by the lever 19, the equipment is not damaged. Owing to the heart-shape of cam 11, coupling 3 also works as a re-aligning device between shaft 1 and disc 2 so that they regain a well determined mutual position whenever lever 19 does not engage with toothing 18.

In the example, for a decimal 2-figure coding, the blowing nozzles are divided into two groups, i.e. from $0u.e.$ to $9u.e.$ and from $1d.e.$ to $9d.e.$ respectively and form together a series of blowing nozzle means. All the nozzles of each group are connected in parallel via first pipings 27 and 28 respectively, said first pipings being connected to a source of fluid under pressure through respective sequence valves 29 and 30, the plugs of which respectively 31 and 32 are subject to the action of springs 33 and 34 respectively (see FIG. 4).

Also mechanism 25 with piston 26 is connected via flow duct 35 to the fluid source through valve 36, the control member 37 of which is under the action of spring 38.

It will be appreciated that piston 26, duct 35 and valve 36 constitute connecting means connecting the above said locking means 18, 19, with the cam 41 of the sequencing means 39–42.

Control members 31–32 and 37 belonging to valves 29, 30 and 36 are actuated by cams 39–40 and 41 respectively. These cams are keyed onto a rotary shaft 42 driven by a motor (not shown).

It will be appreciated that valves 29, 30 and 36, cams 39, 40, 41 and the motor actuating shaft 42 constitute a sequencing mechanism.

Figure 3:
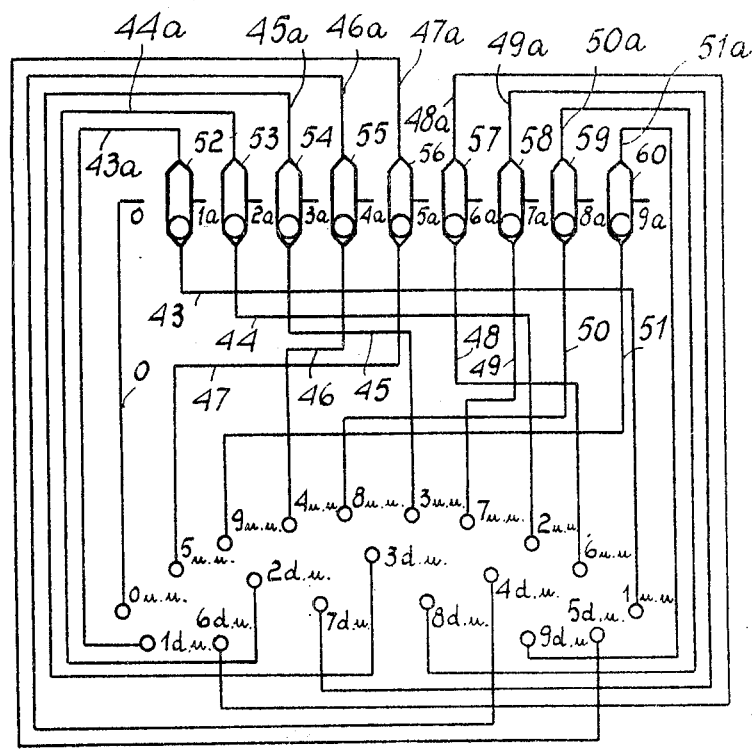
FIG. 3 represents the fluid-functional diagram on the converter output side.

The receiving nozzles from $1u.u.$ to $9u.u.$ and from $1d.u.$ to $9d.u.$ form together a series of receiving nozzle means and are connected by means of flow ducts, or second pipings indicated by reference numbers 43 through 51 and 43a through 51a, respectively to two-input logical circuit devices, shown by reference numbers 52 through 60, the outputs of which are shown by reference numbers 1a through 9a (see FIG. 3).

It will be appreciated that each receiving nozzle means faces one blowing nozzle means and form a nozzle couple therewith.

Figure 5:
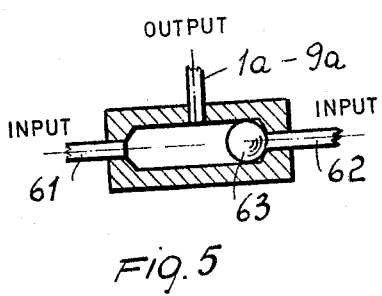

Nozzle $0u.u.$ is connected via the duct shown as 0' directly to the output shown as 0. Such logical circuit devices 52–60, as represented on the functional diagram given in FIG. 3, are of the type with two inputs as shown in FIG. 5. The devices numbered 52–60 are commonly known as OR-logical devices. Ducts 61 and 62 are the two inputs, the duct being the output. A ball 63 can move freely inside and operates so as to shut off one input so that the fluid incoming from the other input will not escape. This type of logical device shown in FIG. 5 is convenient for the above-described example for values from 0 to 99 and is applied to the exemplifying diagram of FIG. 3.

Figure 6:
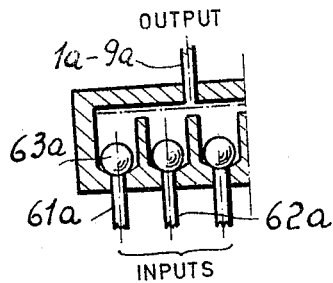

In FIG. 6 an example of logical device with more than two inputs, suitable for values from 100 onward is shown. The parts of this logical device of FIG. 6 are indicated with the same reference numbers as those of the logical device shown in FIG. 5, provided with an index $a$.

In FIG. 7 a type of logical device with amplified output pulses is shown. This type of amplifying logical device, shown by way of example, is provided with more than two inputs and comprises for each input one chamber 64, delimited by a diaphragm 65. The action of the input pulse is exerted upon the corresponding diaphragm 65 in such a way as to displace, against the action of the return spring 66, the plug 67 which puts the output into communication with a duct 68, connected to the fluid source.

A two input device of the general kind shown in FIG. 7 is shown in FIG. 7A. The device is shown here in the state where an air pressure signal is applied to connection $61b$. This logical device shown in FIG. 7A may be inserted in the logical circuit of FIG. 3 in the following manner. Suppose that e.g. the logical device 52 has been removed and that the logical device of FIG. 7A has been put in its place. In such case one of the inputs thereof will be connected to pipe 43a and the other to pipe 43 and the respective output will be connected to 1a as seen in FIG. 3. The terminal 68 will be connected to the fluid source.

The operation of the above-described converter is easily deducible from the foregoing description made with reference to the figures in the accompanying drawing. The motion of shaft 1, the angular position of which represents the analog quantity to be converted, is transmitted to disc 2. The reading of the position of disc 2 takes place according to the sequence determined by the sequencing mechanism, shown in FIG. 4, i.e. disc 2 is firstly positioned through positioning device 18–26 and subsequently the blowing nozzles are selectively put into communication with the fluid source, so that when said holes and slots happen to be placed between said nozzles a flow of fluid occurs from the blowing nozzle to the associated receiving nozzle, connected to the corresponding logical device, the task of which is to deliver to one single (output) duct signals emanating from more ducts. In the specific case of the shown example, the signals coming from different receiving nozzle series and representing the same figure will be delivered to the (output) line corresponding to such figure. The number of logical elements needed depends upon the numeration system used. For example, in the case of decimal numeration system, for counting from 0 to 99 nine logical elements (see FIG. 3) suffice.

The above described logical elements or devices are commonly known as OR-logical elements, or OR-devices.

It will be appreciated that the reading outputs 0 and 1a through 9a may be connected to any known reading or recording equipment.

It may be supposed, for example, that the reading outputs or output connections 0 and 1a–9a are connected to ten pneumatic cylinders, placed on top of the keys of the figures of a typewriter. In this, as known, numbers are written writing the figures in succession from left to right. For example: if three figures are successively pointed, the figure first actuated will indicate the hundreds, the second actuated figure the tens and the third actuated figure the units. The reading outputs 0 and 1a through 9a will each be connected to the piston cylinders actuating the figures from 0 to 9 respectively of the typewriter. It will be noted from FIG. 4 that the cam shaft 42 rotates in the direction of the arrow A and that therefore cam 39 controlling the nozzle series of the tens ($1d.e.$ through $9d.e.$, FIG. 4) will allow through valve 29 first the pressure fluid to enter pipe 28 and subsequently cam 40 will allow, through valve 30, the fluid under pressure to enter pipe 27 of the nozzle series of the units (from $0u.e.$ to $9u.e.$).

It will be appreciated that, in any reading position of disc 2, at the most one couple of nozzles of the series of the tens and at the most one couple of the series of the units will be allowed, by the apertures of disc 2, to communicate with each other. In fact, as may be seen in FIG. 8, the mutual position of the nozzles and of the apertures on the disc are accordingly arranged.

For example to have the typewriter write the number 32, the disc 2 has to be rotated in a position in which slot 7 is placed between the couple of nozzles 3d.u. and 3d.e. (see dashed line in FIG. 8) of the series of the tens allowing thus the fluid to flow from nozzle 3d.e. to nozzle 3d.u. and an opening 5 is placed between the couple of nozzles 2u.e. and 2u.u. of the series of the units allowing thus the passage of the fluid from nozzle 2u.e. towards nozzle 2u.u. In all other couples of nozzles the passage will be prevented Now owing to the cam 39 the fluid will first flow as follows: 29–28–3d.e. (FIG. 4), 3d.u.–45a–54–3a (FIG. 3), and will actuate the number 3 in the typewriter. After a short time interval, owing to cam 40, the fluid will flow as follows: 30–27–2u.e. (FIG. 4), 2u.u.–44–53–2a (FIG. 3), and will actuate the number 2 of the typewriter. Owing to the fact that number 3 was first actuated and number 2 subsequently the typewriter will record the number 32.

In the tests carried out an air pressure of 20 p.s.i.g. was used to feed the blowing nozzles. Shaft 1 was rotated by a pressure gage calibrated for a 3 to 15 p.s.i.g. input. The foregoing embodiments have been evidently given only for exemplification purposes, and it is consequently obvious that in practice such a converter is subject to several changes and modifications of functional details without however departing from the scope of this invention.

So for example, it is evident that the arrangement of the openings on the disc 2 and the arrangement of the nozzles may be varied depending upon the numeration system adopted (decimal, binary, telex code systems and the like) and the quantity of data passages. Furthermore, it is manifest from the foregoing that such a converter lends itself to converting to pressure and/or flow digital signals not only angular or linear movements, but also any other entity whatsoever likely to be converted in turn to such movements.

Furthermore, it will be evident that the same above described device, besides being used as a converter may be used also as an apparatus for the reading of punch card or tape or similar recording of data. In such case the coding disc has to be replaced by the punched card or tape.

I claim:

A fluid operated analog-digital converter, comprising means for receiving an analog signal in the form of an angular movement, a series of blowing nozzle means and a series receiving nozzle means, each receiving nozzle facing one blowing nozzle means and forming a nozzle means couple therewith, a rotatable disc connected with said means for receiving an analog signal and placed between said series of blowing nozzle means and said series of receiving nozzle means for stopping any flow between said blowing and receiving nozzle means in certain positions of said rotatable disc, passage means opened in said rotatable disc for allowing in certain other positions of said rotatable disc the flow between certain of said nozzle couples, the layout of said passage means and the layout of said nozzle couples having a digital coding relationship to each other, a source of fluid under pressure, first piping means connecting said blowing nozzle means to said source of fluid, output connections of the analog-digital converter, second piping means connecting said receiving nozzle means to said output connections, valve means controlling the fluid flow in said first piping means and sequencing means governing the opening and closing of said valve means, OR logical devices interposed between said receiving nozzle means and said output connections and controlling the fluid signals coming from said receiving nozzle means, said means for receiving an analog signal in the form of an angular movement comprising: a shaft receiving said angular movement, an elastic coupling elastically connecting said shaft with said disc for transmitting said angular movement of said shaft to said disc, said coupling having means elastically urging said disc in a preestablished normal position thereof with respect to said shaft; locking means for temporary locking said disc in different preestablished positions thereof with respect to said nozzle couples and connecting means connecting said locking means with said sequencing means for controlling the locking and unlocking action of said locking means.

References Cited by the Examiner
UNITED STATES PATENTS

| | | |
|---|---|---|
| 2,341,644 | 2/1944 | Moller et al. |
| 2,575,792 | 11/1951 | Bullard et al. _____ 192—142 |
| 2,596,550 | 5/1952 | Handley. |
| 2,871,869 | 2/1959 | Howard. |
| 2,900,130 | 8/1959 | Lambert _____ 235—61.117 |
| 2,953,148 | 9/1960 | Langford et al. |
| 2,970,571 | 2/1961 | Pecchenino. |
| 2,982,902 | 5/1961 | Gates et al. |
| 3,047,048 | 7/1962 | Appleby. |
| 3,072,146 | 1/1963 | Gizeski _____ 235—200 X |
| 3,202,180 | 8/1965 | Gray _____ 235—201 |

FOREIGN PATENTS

| | | |
|---|---|---|
| 1,039,092 | 10/1953 | France. |
| 1,089,975 | 3/1955 | France. |

OTHER REFERENCES

"Now a Ball Type Fluid Digital Computer," Control Engineering, August 1961, pages 47–50.

Luk'yonov and Eygenbrot, "Some Problems in the Construction of Pneumatic Systems of Multi-Point Monitoring, Regulation and Control," in "New Developments in Pneumatic-Hydraulic Automation," edited by M. A. Ayzerman, U.S. Department of Commerce Office of Technical Services, January 2, 1964, pages 24–36 (note original U.S.S.R. publication date of October 22, 1962).

RICHARD B. WILKINSON, *Primary Examiner.*

LEO SMILOW, *Examiner.*

C. G. COVELL, WAYNE F. BAUER,
*Assistant Examiners.*